United States Patent
Ohnishi et al.

(10) Patent No.: US 6,899,283 B2
(45) Date of Patent: May 31, 2005

(54) LIQUID DROPLET EJECTING METHOD AND A LIQUID DROPLET EJECTION APPARATUS

(75) Inventors: Takao Ohnishi, Aichi-Prefecture (JP); Toshikazu Hirota, Nagoya (JP); Yoshihiro Iseki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 229 days.

(21) Appl. No.: 10/252,735

(22) Filed: Sep. 23, 2002

(65) Prior Publication Data

US 2003/0080160 A1 May 1, 2003

(30) Foreign Application Priority Data

Sep. 25, 2001 (JP) ........................................ 2001-291302

(51) Int. Cl.[7] .............................................. B05B 3/04
(52) U.S. Cl. .................................................... 239/102.1
(58) Field of Search ........................... 239/102.1; 347/5, 347/40, 68, 71–74

(56) References Cited

U.S. PATENT DOCUMENTS

| | | | |
|---|---|---|---|
| 5,865,860 A | * 2/1999 | Delnick | 29/623.5 |
| 5,997,122 A | * 12/1999 | Moriyama et al. | 347/11 |
| 6,024,925 A | 2/2000 | Little et al. | |
| 6,063,339 A | 5/2000 | Tisone et al. | |
| 6,264,310 B1 | * 7/2001 | Toru et al. | 347/70 |
| 6,629,756 B2 | * 10/2003 | Wang et al. | 347/68 |
| 6,656,432 B1 | * 12/2003 | Hirota et al. | 422/100 |

FOREIGN PATENT DOCUMENTS

| | | |
|---|---|---|
| JP | 2001-186880 | 7/2001 |
| WO | 01/52991 A1 | 7/2001 |

OTHER PUBLICATIONS

Patent Abstracts of Japan, vol. 2002, No. 02, Apr. 2, 2002 & JP 2001 270111 A (Seiko Epson Corp.), Oct. 2, 2001 *abstract*.

* cited by examiner

*Primary Examiner*—Michael Mar
*Assistant Examiner*—Thach H. Bui
(74) *Attorney, Agent, or Firm*—Burr & Brown

(57) ABSTRACT

A liquid droplet ejection method and apparatus comprising a base member and a piezoelectric/electrostrictive element. The interior of the base member includes a pressurizing chamber and an ejection opening. When the interval from the last pressurizing operation to the current pressurizing operation exceeds a predetermined time, applied voltage to the piezoelectric/electrostrictive element is increased at a first increase rate so that liquid within the pressurizing chamber is pressurized for ejection at a first pressurizing increase rate. When the interval from the last pressurizing operation to the current pressurizing operation is shorter than the predetermined time, the applied voltage is increased at a second increase rate smaller than the first increase rate so that the liquid is pressurized for ejection at a second pressurizing rate which is relatively small. This ensures proper pressurization of a liquid whose viscosity increases over time, achieving proper ejections.

15 Claims, 14 Drawing Sheets

LIQUID DROPLET EJECTING METHOD AND A LIQUID DROPLET EJECTION APPARATUS

BACKGROUND OF THE INVENTION

1. Field of the Invention

The present invention relates generally to a liquid droplet ejecting method using a liquid droplet ejection apparatus which ejects liquid in the form of minute droplets from an ejection opening through pressurization of the liquid within a pressurizing chamber, and to a such liquid droplet ejection apparatus. More particularly, the present invention relates to a liquid droplet ejecting method and a liquid droplet ejection apparatus for ejecting the minute liquid droplets over a plurality of times through repetitive intermittent operations of pressurization.

2. Description of the Related Art

The liquid droplet ejecting method of this type is disclosed in, for example, Japanese Patent Application Laid-Open (kokai) No. 2001-186880. The technique disclosed in this gazette includes filling a pressurizing chamber with liquid (DNA fragment solution) containing DNA fragments, and driving a piezoelectric/electrostrictive element disposed on the wall surface of the pressurizing chamber, thereby changing the volume of the pressurizing chamber so as to pressurize the liquid within the pressurizing chamber, to consequently eject the liquid as minute liquid droplets from the ejection opening in liquid communication with the pressurizing chamber so that liquid droplets are formed on a substrate such as a microscope slide glass confronting the ejection opening. This liquid droplet ejecting method comprises setting to a minute amount the amount of liquid droplet ejected (i.e. ejecting a predetermined minute amount of liquid droplet) by a single operation of pressurization (ejecting operation) and intermittently repeating the operation of pressurization so that the minute liquid droplet drops onto the substrate at the same spot over a plurality of times. The number of operations of pressurization is adjusted so as to allow the amount of a single liquid droplet and/or the diameter of the liquid droplet formed on the substrate to precisely be controlled.

In the above disclosed liquid droplet ejecting method, the pressurizing rate (or speed) in each operation of pressurization (applied voltage changing speed when the pressurizing means are the piezoelectric/electrostrictive element) is constant, and thus the ejecting speed of the minute liquid droplets ejected is unvaried. For this reason, in case of ejecting liquid whose viscosity varies with the lapse of time, such as the liquid containing DNA fragments, the ejecting force becomes excessively large when liquid with lower viscosity is ejected, if the pressurizing speed is set to a level appropriate for higher viscosity, with the result that more minute liquid droplets scatter at the ejection opening end in directions different from the main direction of ejection, which may possibly reach other adjacent liquid droplets on the substrate. On the contrary, if the pressurizing speed is set to a level suited for lower liquid viscosity in order to obviate the above scattering, the ejecting force becomes excessively small when liquid with higher viscosity is ejected. As a result, whereupon the direction of ejection of the liquid droplets may possibly differ from the target direction.

SUMMARY OF THE INVENTION

An object of the present invention is to solve the above deficiencies. To achieve the object, the present invention provides a method for ejecting liquid droplets by use of a liquid droplet ejection apparatus, said liquid droplet ejection apparatus comprising a pressurizing chamber which has an ejection opening and which is filled with liquid whose viscosity varies with the lapse of time, and pressurizing means for pressurizing said liquid within said pressurizing chamber, said liquid droplet ejection apparatus configured to eject said liquid in the form of substantially a single minute liquid droplet from said ejection opening through a single pressurizing operation by said pressurizing means, characterized in that a plurality of minute liquid droplets are ejected through intermittently iterating said single pressurizing operation by said pressurizing means, and a rate of pressurization by said pressurizing operation is varied depending on intervals between said pressurizing operations iterated.

Also, the present invention provides a liquid droplet ejection apparatus having a pressurizing chamber which has an ejection opening and which is filled with liquid whose viscosity varies with the lapse of time, and pressurizing means for pressurizing said liquid within said pressurizing chamber, to eject said liquid in the form of substantially a single minute liquid droplet from said ejection opening through a single pressurizing operation by said pressurizing means, comprising means for ejecting a plurality of minute liquid droplets through intermittently iterating said single pressurizing operation by said pressurizing means; and means for varying a rate of pressurization by said pressurizing operation depending on intervals between said pressurizing operations iterated.

By virtue of this configuration, the liquid pressurizing rate is changed depending on the interval between the pressurizing operations, i.e., depending on the viscosity of liquid (whose viscosity varies with the lapse of time) to be ejected. Therefore, it is possible to set the pressurizing rate suited for ejections of minute liquid droplets and to prevent scattering of the liquid droplets and occurrence of deviation from the target direction in which the liquid droplets are ejected.

In this case, it is preferred that the intermittent ejections of the minute liquid droplets is performed (i.e. said means for ejecting ejects said minute liquid droplets intermittently) onto the same spot to form a single liquid droplet at the spot.

By virtue of this configuration, a single liquid droplet having a proper (desired) quantity and/or a proper (desired) diameter can be formed on the substrate confronting the ejection opening, with the result that it is possible to readily manufacture detection chips having on its substrates detection points (spots) made of solutions containing intravital substances such as DNA fragments or proteins (including antibodies).

In the liquid droplet ejecting method and the liquid droplet ejecting apparatus, it is preferred to pressurize the liquid for ejection at a first pressurizing rate when the interval from the last pressurizing operation to the current pressurizing operation is longer than predetermined time, and to pressurize the liquid for ejection at a second pressurizing rate which is smaller than the first pressurizing rate when the interval from the last pressurizing operation to the current pressurizing operation is shorter than the predetermined time.

By virtue of this configuration, the liquid droplet ejecting direction can be kept in the aiming direction since the liquid is pressurized for ejection at the first pressurizing rate which is relatively large when the interval from the last pressurizing operation to the current pressurizing operation is longer than a predetermined time, i.e., when the liquid to be ejected has a high viscosity. On the contrary, when the interval from the last pressurizing operation to the current pressurizing operation is shorter than the predetermined time, i.e., when the liquid to be ejected has a low viscosity, the liquid is pressurized for ejection at the second pressurizing rate which is relatively small, thereby preventing scattering of the liquid which may occur at the ejection opening.

In cases where the pressurizing means is a piezoelectric/electrostrictive element which changes the volume of the pressurizing chamber depending on voltage applied, it is preferred to set the rate of change of the voltage to a first voltage increase rate when the liquid is pressurized at the first pressurizing rate, and to set the rate of change of the voltage to a second voltage increase rate which is smaller than the first voltage increase rate when the liquid is pressurized at the second pressurizing rate.

In any case of the above, the ratio of the first pressurizing rate to the second pressurizing rate is preferably set to a value which is more than 1 and not more than 4.8.

Preferably, the initial velocity of minute droplets ejected by pressurizing operation at the first pressurizing rate is a velocity of 0.1 to 10 m/s.

According to those configurations, it becomes possible to form at a high density on the substrate liquid droplets of, e.g., solutions containing intravital substances such as DNA fragments or proteins (including antibodies).

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENT

Figure 1:
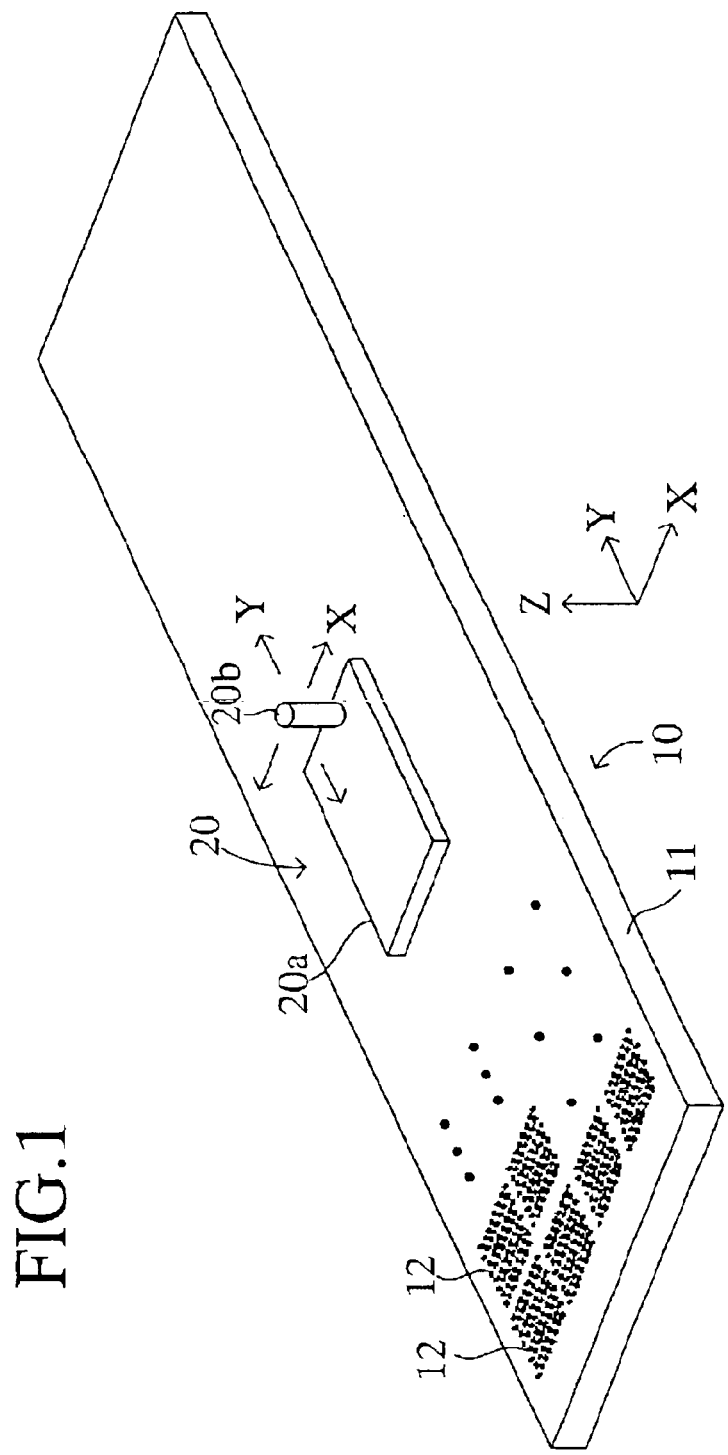
FIG. 1 is a perspective view schematically showing a liquid droplet ejection apparatus for use in a liquid droplet ejecting method in accordance with an embodiment of the present invention, as well as a DNA chip formed by the liquid droplet ejecting method.

An embodiment of a liquid droplet ejecting method in accordance with the present invention will now be described with reference to the accompanying drawings. FIG. 1 is a schematic perspective view of a liquid droplet ejection apparatus 20 which uses the liquid droplet ejecting method of FIG. 1. The apparatus manufactures a DNA chip 10 which is a sort of a detection chip. The DNA chip 10 comprises a slide glass substrate 11 on which are arranged a plurality of (e.g., approx. 3000) detection points (spots) 12 each containing different DNA fragments, and is utilized for analysis of gene structure for example.

The liquid droplet ejection apparatus 20 comprises a planar head 20a and a support 20b integrally formed with the head 20a. The head 20a moves in a plane parallel to the flat surface of the substrate 11 and in directions of X-axis and Y-axis which are orthogonal to each other, as a result of movement of the support 20b by an XYZθ moving unit (Refer to FIG. 8) not shown in FIG. 1.

Figure 2:
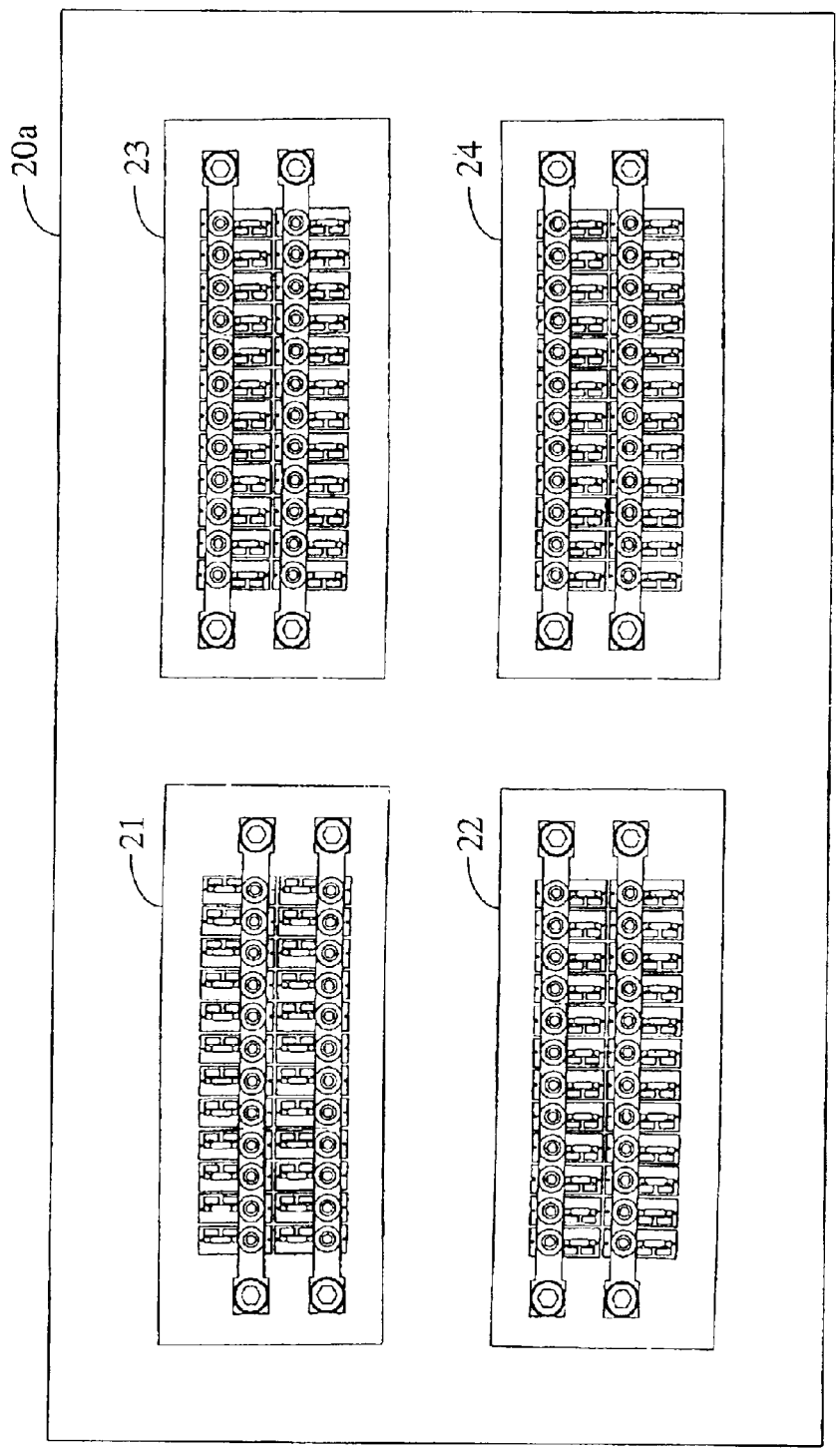
FIG. 2 is a top plan view of ahead of the liquid droplet ejection apparatus shown in FIG. 1.

The head 20a shown in top plan in FIG. 2 comprises four modules, i.e., first to fourth modules 21 to 24 each having the same structure. The modules 21 to 24 have a substantially rectangular shape in plan. The first 21 and second 22 modules are disposed such that their respective long sides are opposed to each other, with long sides of the third 23 and fourth 24 modules being opposed to each other. The first 21 and third 23 modules are disposed such that their respective short sides are opposed to each other, with short sides of the second 22 and fourth 24 modules being opposed to each other. Description will be made herein below of the detailed structure of the first module 21 as a representative example.

Figure 3:
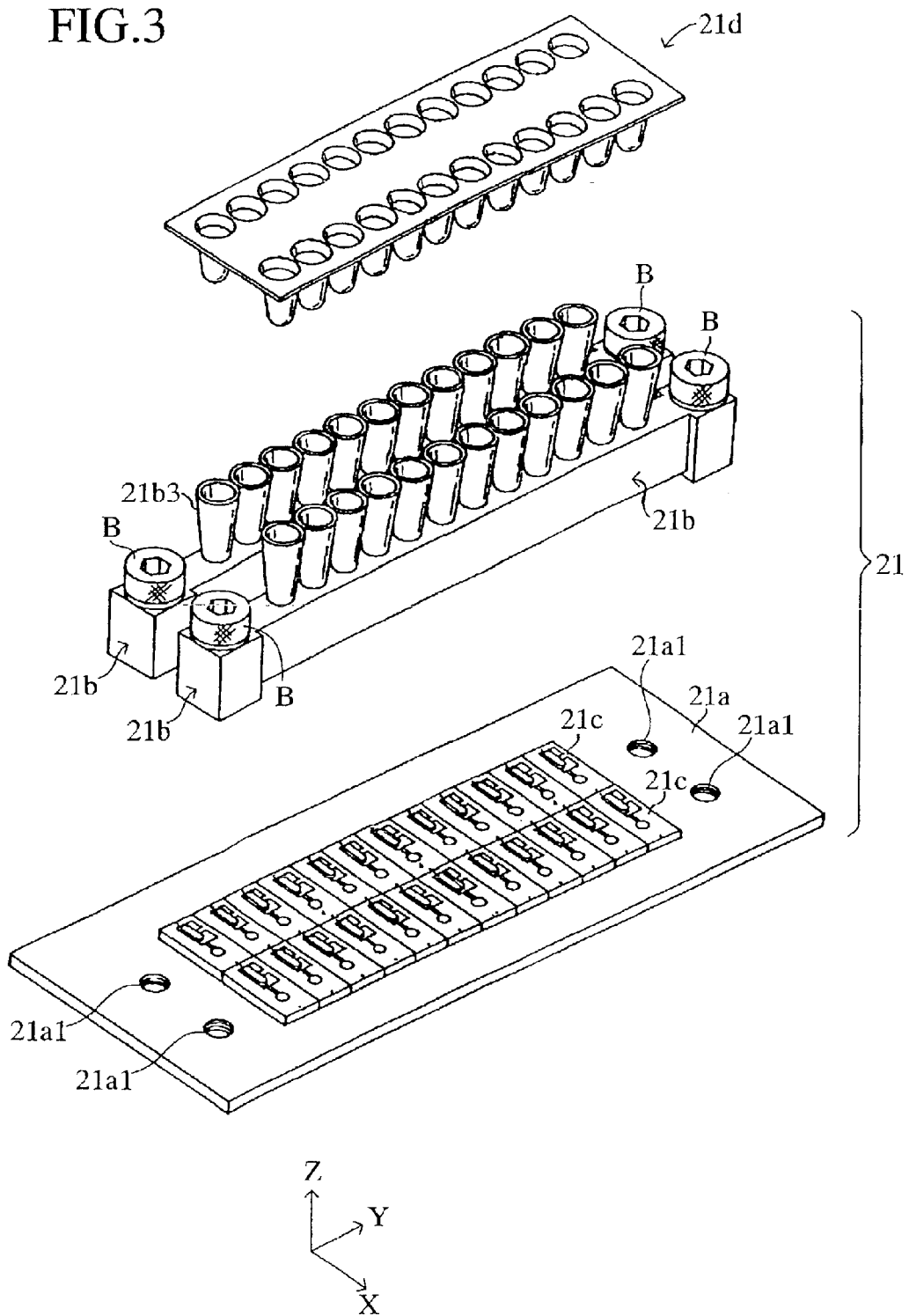
FIG. 3 is a schematic exploded perspective view of a module mounted on the head of the liquid droplet ejection apparatus shown in FIG. 1.

The first module 21 as shown in FIG. 3, which is a schematic perspective view thereof, comprises a base 21a and a pair of fixing jigs 21b. The base 21a is a rectangular thin plate having edges extending along X-axis and Y-axis in plan. The base 21a has on its top surface a plurality of micropipettes 21c. The micropipettes 21c are arrayed in 12 rows and 2 columns and secured to the top surface of the base 21a by way of the pair of fixing jigs 21b as will be described later.

Figure 4:
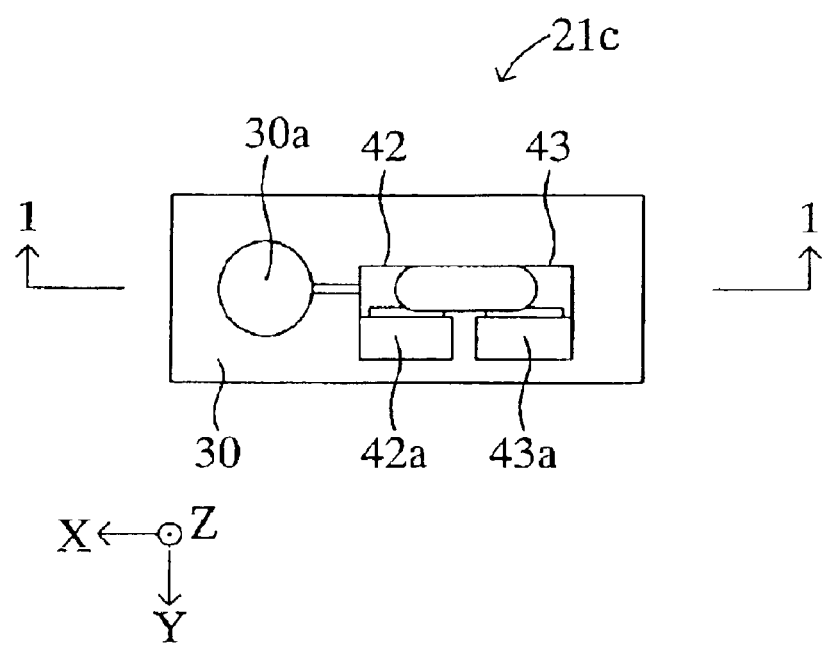
FIG. 4 is a top plan view of a micropipette mounted on the module shown in FIG. 3.
Figure 5:
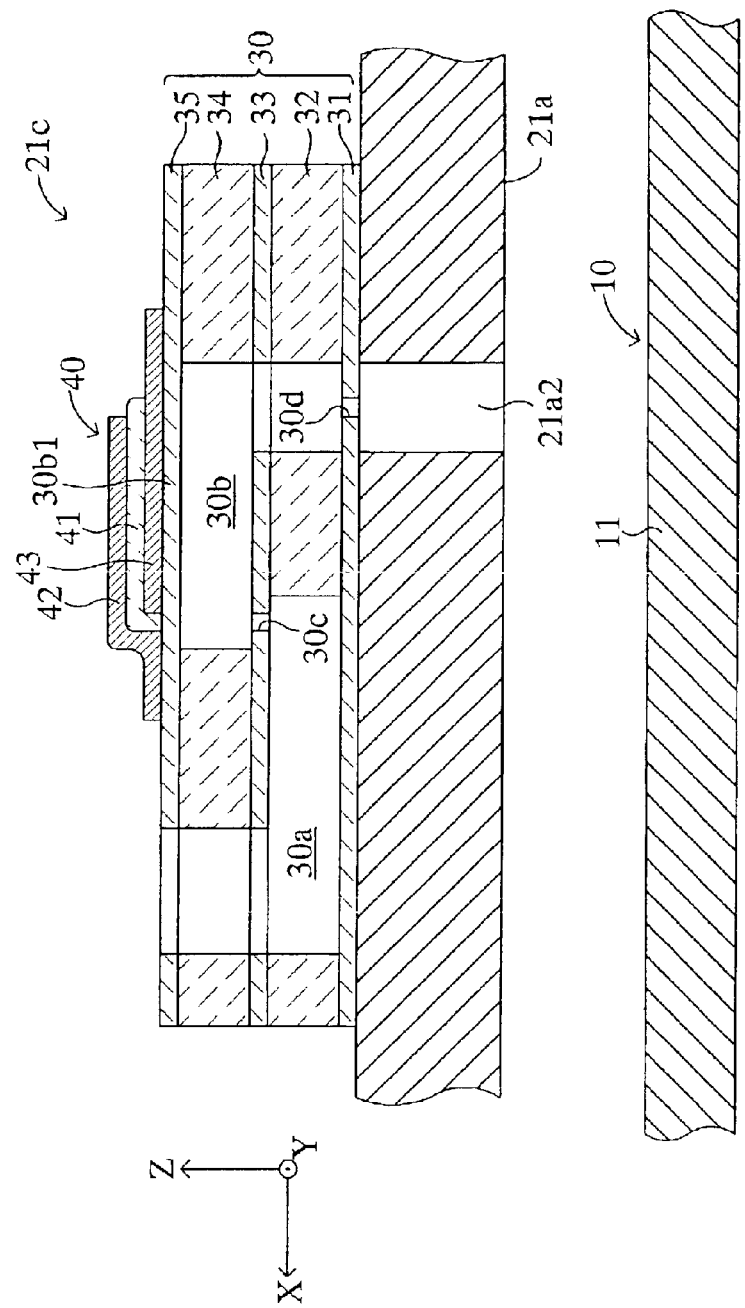
FIG. 5 is a sectional view of the micropipette taken along line 1—1 of FIG. 4.

Referring to FIG. 4 which is a top plan view of the micropipette 21c and to FIG. 5 which is a sectional view of the same taken along line 1—1 of FIG. 4, the micropipette 21c comprises a substantially rectangular parallelepipedic base member 30 having edges extending parallel to X-axis, Y-axis and Z-axis which are orthogonal to one another, and thin-plate-like pressurizing means 40. The base member 30 includes a plurality of ceramics thin plates (hereinafter referred to as "ceramic sheets) 31 to 35 which are stacked and press bonded in order in the positive direction of Z-axis. The pressurizing means 40 are firmly secured to the external surface (surface toward the positive direction of Z-axis) of the ceramic sheet 35. The interior of the base member 30 is formed to include a liquid supply passage 30a, a pressurizing chamber (cavity) 30b, a liquid introduction bore 30c allowing the liquid supply passage 30a and the pressurizing chamber 30b to communicate with each other, and an ejection opening 30d.

The liquid supply passage 30a consists of a space defined by sidewall surfaces of a substantially rectangular notch having edges extending along X-axis and Y-axis, by the top surface of the ceramic sheet 31 and by the undersurface of the ceramic sheet 33, and of cylindrical bores in communication with the space, formed in the ceramic sheets 33 to 35, such that liquid (DNA fragment solution) to be ejected is supplied thereinto through the bore formed in the ceramic sheet 35.

The DNA fragment solution (liquid containing DNA fragments) is obtained by leaving to stand for several hours a mixture of PCR (Polymerase Chain Reaction) products obtained by amplifying DNA fragments with a PCR machine and 3M sodium acetate and isopropanol added thereto, settling the PCR products using a centrifuge, dehydrating them to obtain DNA powders, adding buffer liquid (e.g., TE buffer solution) to the DNA powders to obtain a concentration of 1–10 µg/µ liter, and then diluting it with water, saline solution, a solution containing monomer and/or polymer. The resultant DNA fragment solution is a solution whose solvent can relatively early evaporate when exposed to air and whose viscosity increases with the lapse of time.

Referring again to FIG. 5, the pressurizing chamber 30b consists of a space defined by sidewall surfaces of a substantially rectangular notch having edges extending along X-axis and Y-axis, by the top surface of the ceramic sheet 33 and by the undersurface of the ceramic sheet 35, and of cylindrical bores in communication with the space, formed in the ceramic sheets 33 and 32. The pressurizing chamber 30b has an end in the positive direction of X-axis. The end extends up to the top of the liquid supply passage 30a formed in the ceramic sheet 32, and thereby the pressurizing chamber 30b is in communication with the liquid supply passage 30a at that end by way of the small-diameter cylindrical introduction bore 30c formed in the ceramic sheet 33. The ejection opening 30d is a small-diameter cylindrical bore formed in the ceramic sheet 31 so as to allow the pressurizing chamber 30b to communicate with the exterior of the micropipette 21c.

The pressurizing means 40 includes a thin-plate-like piezoelectric/electrostrictive element 41, and an upper electrode 42 and a lower electrode 43 which are disposed respectively on the top surface and the undersurface of the piezoelectric/electrostrictive element 41. As seen in FIG. 4, the upper 42 and lower 43 electrodes are provided with pads 42a and 43a, respectively, connected to a piezoelectric/electrostrictive element drive unit (Refer to FIG. 8) which will be described later. The piezoelectric/electrostrictive element 41 is actuated by an electric potential difference (applied voltage V) applied across the upper electrode 42 and the lower electrode 43 to deform the ceramic sheet 35 (the upper wall 30b1 of the pressurizing chamber 30b), thereby changing the volume of the pressurizing chamber 30b by $\Delta V$ to thus pressurize liquid within the pressurizing chamber, allowing the liquid to be ejected in the form of minute liquid droplets from the ejection opening 30d.

On the other hand, as shown in FIG. 3, the above-described base 21a is provided with a pair of fixing apertures 21a1 at each end in Y-axis direction and has a plurality of (24 in total) through-holes 21a2 having a diameter enough larger than the diameter of the ejection openings 30d. As shown in FIG. 5, the through-holes 21a2 is positioned in response to the ejection openings 30d of the micropipettes 21c, when the micropipettes 21c are arrayed on top of the base 21a.

Figure 6:
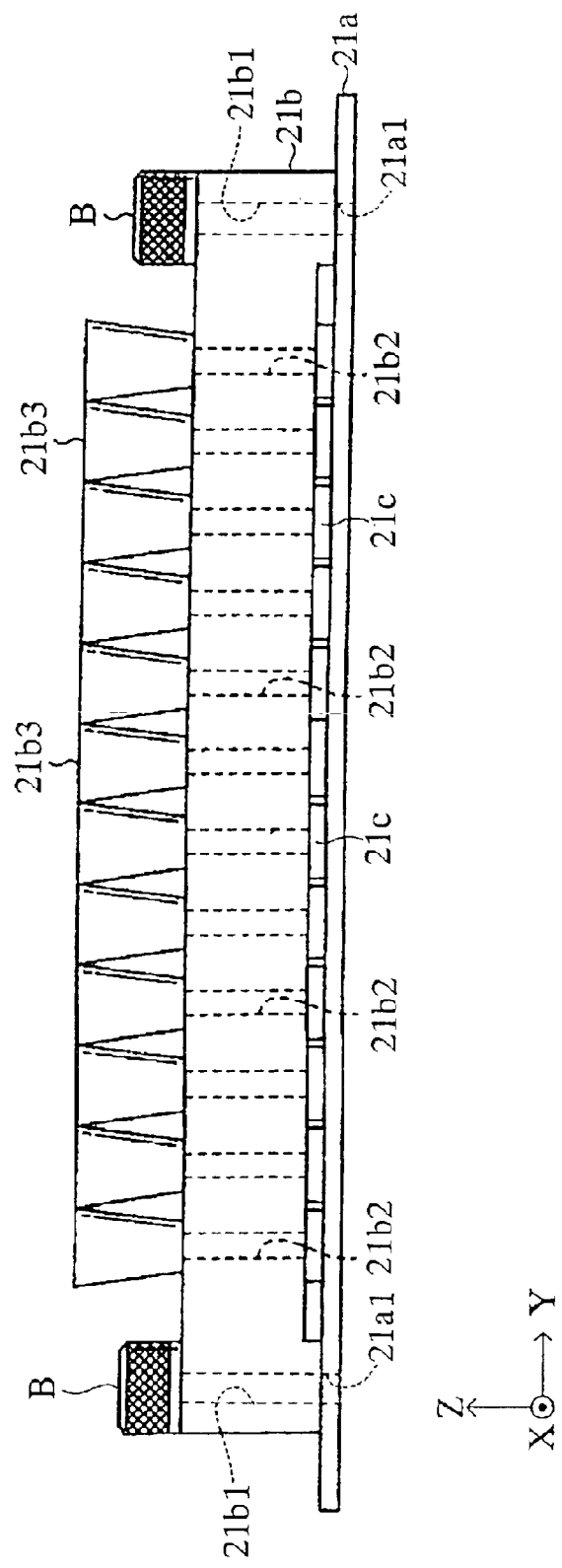
FIG. 6 is a front view of the module shown in FIG. 3.
Figure 7:
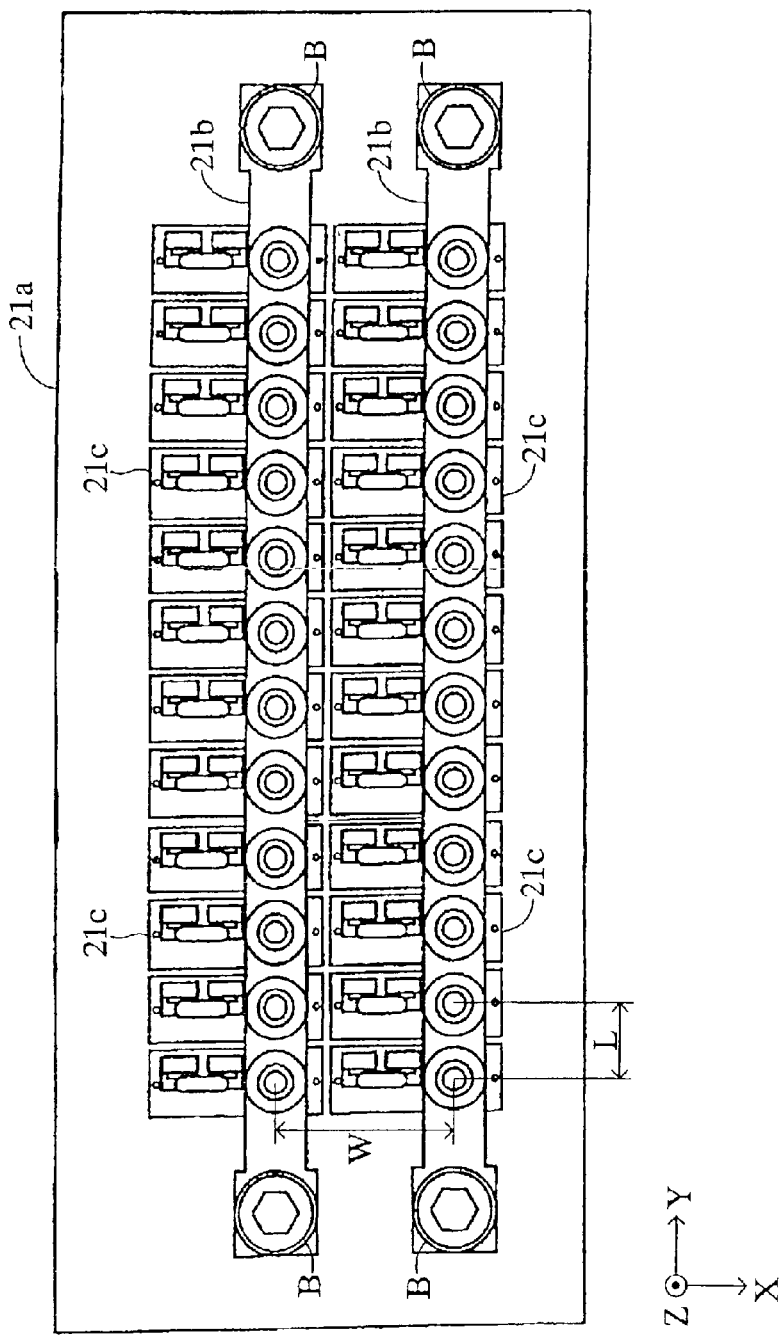
FIG. 7 is a top plan view of the module shown in FIG. 3.

Referring to FIGS. 6 and 7 which are a front view and a top plan view, respectively, of the module 21, each of the pair of fixing jigs 21b is of a substantially rectangular parallelepipedic shape having edges extending along X-axis, Y-axis and Z-axis. The fixing jig 21b has bolt through-holes 21b1 at both ends as shown in FIG. 6 so that the fixing jig is fastened to the base 21a by means of bolts B extending though the bolt through-holes 21b1 and the fixing apertures 21a1 of the base 21a and so that the micropipettes 21c arrayed between the undersurface of the fixing jig 21b and the top surface of the base 21a are thereby clamped to secure the micropipettes 21c to the base 21a.

The fixing jig 21b is provided with cylindrical, hollow liquid passages 21b2 which are in communication with the liquid supply passages 30a of the micropipettes 21c and whose central axes extend in the direction of Z-axis. The fixing jig 21b is also provided with hollow, inverted truncated conical tubes 21b3 in communication with the upper portions of the liquid passages 21b2 for introduction of liquid into the liquid passages 21b2.

Description will then be made of the schematic of a system for controlling the liquid droplet ejection apparatus 20. As seen in a block diagram of FIG. 8, the system comprises an XYZθ moving unit 50 which selectively holds one of the supports 20b of a plurality of liquid droplet ejection apparatus 20 prepared and which moves the support 20b held by the moving unit 50 in order to move the head 20a in X-axis and Y-axis directions (if necessary, further move the head 20a in Z-axis direction and rotate it around Z-axis), the piezoelectric/electrostrictive element drive unit 55 which is connected to electrode pads 42a and 43a of the plurality of micropipettes 21c of the liquid droplet ejection apparatus 20 (head 20a) held by the XYZθ moving unit 50 for providing drive signals (applied voltage V) across the electrode pads 42a and 43a for liquid droplet ejection, and an electrical control unit 60 connected to the XYZθ moving unit 50 and to the piezoelectric/electrostrictive element drive unit 55. The electrical control unit 60 is a microcomputer including a CPU and serves to send a movement instruction signal to the XYZθ moving unit 50 and send a drive instruction signal for application of the applied voltage V to the piezoelectric/electrostrictive element drive unit 55.

A liquid droplet ejecting method using the thus configured liquid droplet ejection apparatus 20 will then be described with reference to FIGS. 9, 10, 12 and 14 which show programs executed by the CPU of the electrical control unit 60, FIG. 11 which shows positions of detection points formed on the glass substrate 11 of the DNA chip 10 and FIG. 13 which shows voltage waveforms of the applied voltage during the pressurization of liquid (during the ejection of minute liquid droplets).

Figure 11:
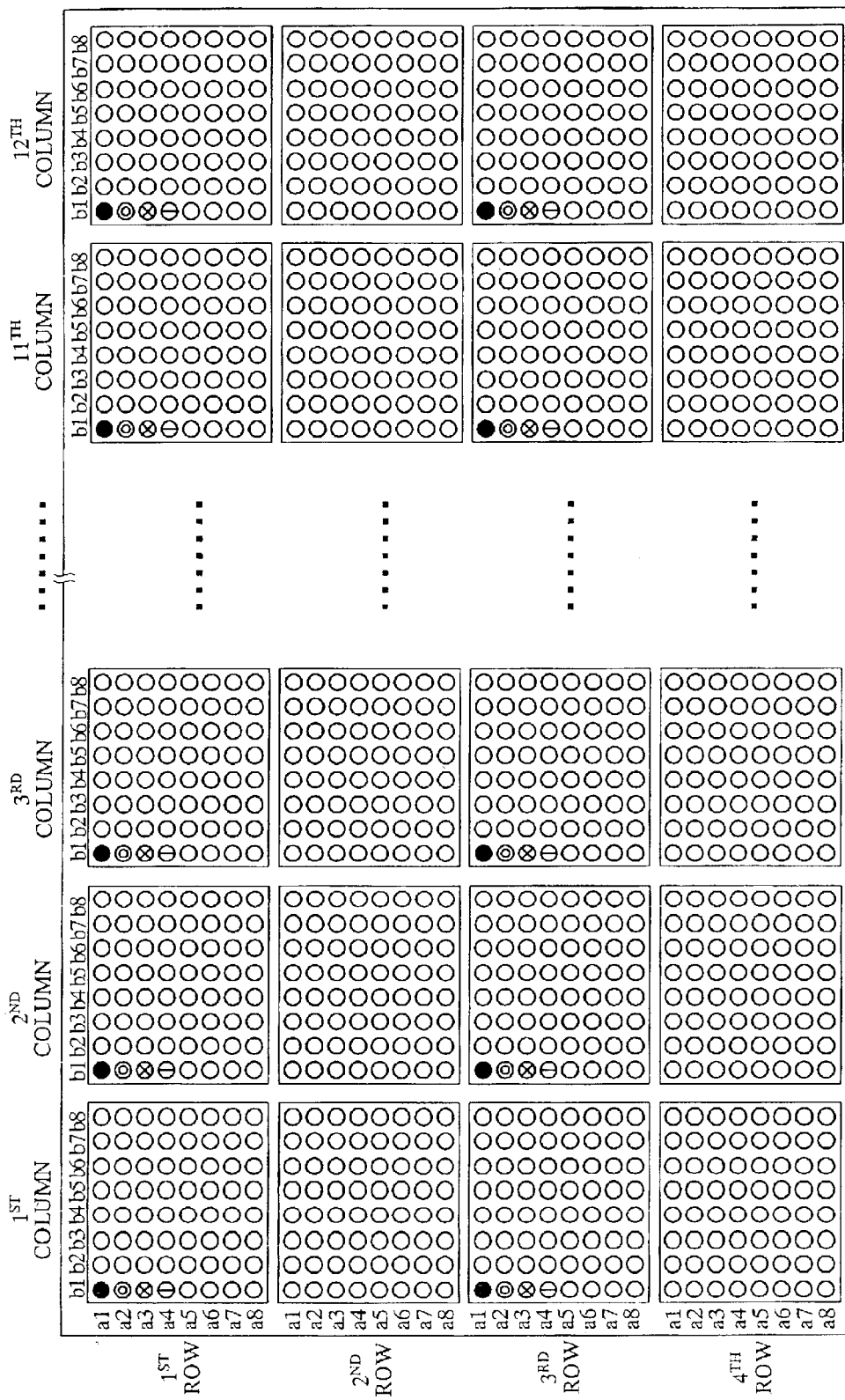
FIG. 11 is a top plan view of a substrate of the DNA chip shown in FIG. 1, showing positions of detection points formed on the substrate.
Figure 12:
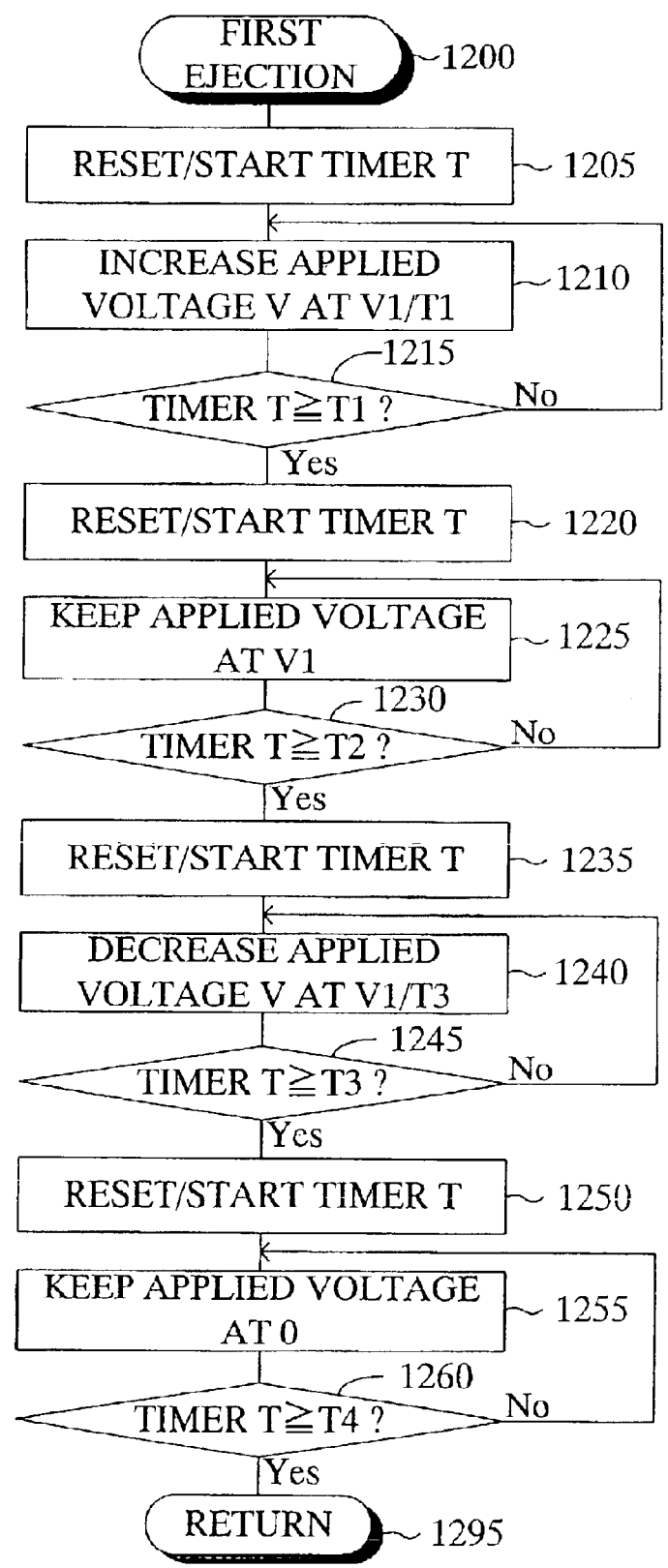
FIG. 12 is a flowchart showing programs executed by the CPU of the electrical control unit shown in FIG. 8.

In this embodiment, as shown in FIG. 11, the detection points are formed in blocks of 4 rows×12 columns on a single glass substrate 11. Each block includes detection points of 8 rows (coordinates $a_1$ to $a_8$)×8 columns (coordinates $b_1$ to $b_8$) which are arrayed. The column interval (width W of FIG. 7) of the ejection openings 30d of the liquid droplet ejection apparatuses 20 is equal to the distance from $1^{st}$ row $a_q$ to $3^{rd}$ row $a_q$ (q is an integer from 1 to 8) on the glass substrate 11 (e.g., the distance from $1^{st}$ row $a_1$ to $3^{rd}$ row $a_1$ on the glass substrate 11) and to the distance from $2^{nd}$ row $a_q$ to $4^{th}$ row $a_q$. The distance (length L of FIG. 7) between adjacent ejection openings 30d within the same row of the ejection openings 30d is equal to the distance from $b_q$ to $b_q$ of the adjacent blocks within the same row (e.g., the distance from $b_1$ in $1^{st}$ row and $1^{st}$ column to $b_1$ in the $1^{st}$ row and $2^{nd}$ column of the glass substrate).

This embodiment prepares 1 to 30 pallets each including kmax (e.g., 20) glass substrates 11 which are arrayed in matrix. Each head 20a is replaced with another after formation of required detection points on top of the glass substrates 11 lying on all the pallets prepared. For convenience, description is made hereinafter of an example manufacturing kmax DNA chips by use of only one pallet.

$1^{st}$ to $32^{nd}$ heads 20a (liquid droplet ejection apparatuses 20), 32 heads 20a in total, are first prepared. Then, the pressurizing chambers 30b are filled with different type of DNA fragment solutions through the liquid supply passages 30a of each of the modules 21 to 24 included in each head 20a. Upon filling (injection) of DNA solutions into the liquid supply passages 30a, a cartridge 21d shown in FIG. 3 is used. Then, when a start switch not shown of the electrical control unit 60 is turned on, the CPU starts the processing from step 900 of FIG. 9 and proceeds to step 905 in which a value "1" is set as a variable h for specifying any one of the 32 heads 20a and in which a value "1" is set as a variable m for specifying any one of the first module 21 to fourth module 24.

The CPU then goes to step 910 to send an instruction signal to the XYZθ moving unit 50 so as to hold a head h (1$^{st}$ head in this case since the value of the variable h is "1") and proceeds to step 915 in which a value "1" is set as a variable k for specifying any one of the glass substrate 11 lying on the pallet. Afterward, the CPU goes to step 920 to determine whether the variable h is an odd number or not. In this case, since the variable h is "1", the CPU makes a "Yes" determination in step 920 to proceed to step 925, in which the ejection opening 30d of the micropipette 21c positioned in the most negative direction of X-axis and in the most negative direction of Y-axis of the m-th module of the h-th head (hereinafter this position of the ejection opening 30d will be referred to as "reference position") is moved to a position just above coordinates $(a_m, b_{(h+1)/2}) = (a_1, b_1)$ in the 1$^{st}$ row on the k-th (in this case, 1$^{st}$) glass substrate 11 shown in FIG. 11. Time Tint1 required for this movement is about 0.5 to 6.0 sec. which is one of intervals between repeated pressurizing operations, i.e., the interval between the last pressurizing operation and the current pressurizing operation, as described below.

The CPU then goes to step 930 to execute first ejection (first injection) of liquid containing DNA fragments. More specifically, the CPU starts from step 1200 first ejection routine processing shown in FIG. 12, and in step 1205 resets a timer T for start (starts of clocking by the timer T). The CPU then goes to step 1210 to increase, at a first voltage increase rate V1/T1 (e.g., 60V/15 μs), the applied voltage V applied across the upper electrode 42 and the lower electrode 43 of each of the micropipettes 21c included in the m-th module of the h-th head.

In step 1215 the CPU determines whether the timer T has clocked first time T1 (e.g., 15 μs) or not (i.e. whether or not the first time has elapsed), and if negative, i.e., if the timer does not clock the first time T1, then repeats the processing of step 1210. On the contrary, if the timer clocks the first time T1, then the CPU makes a "Yes" determination in step 1215 and proceeds to step 1220. It is preferred that the first voltage increase rate V1/T1 be set depending on the dimensions of the ejection opening 30d, the volume of the pressurizing chamber, or the viscosity of solution to be ejected such that the initial velocity of the minute liquid droplet ejected from the ejection opening is a velocity of 0.1 to 10 m/s.

Figure 13:
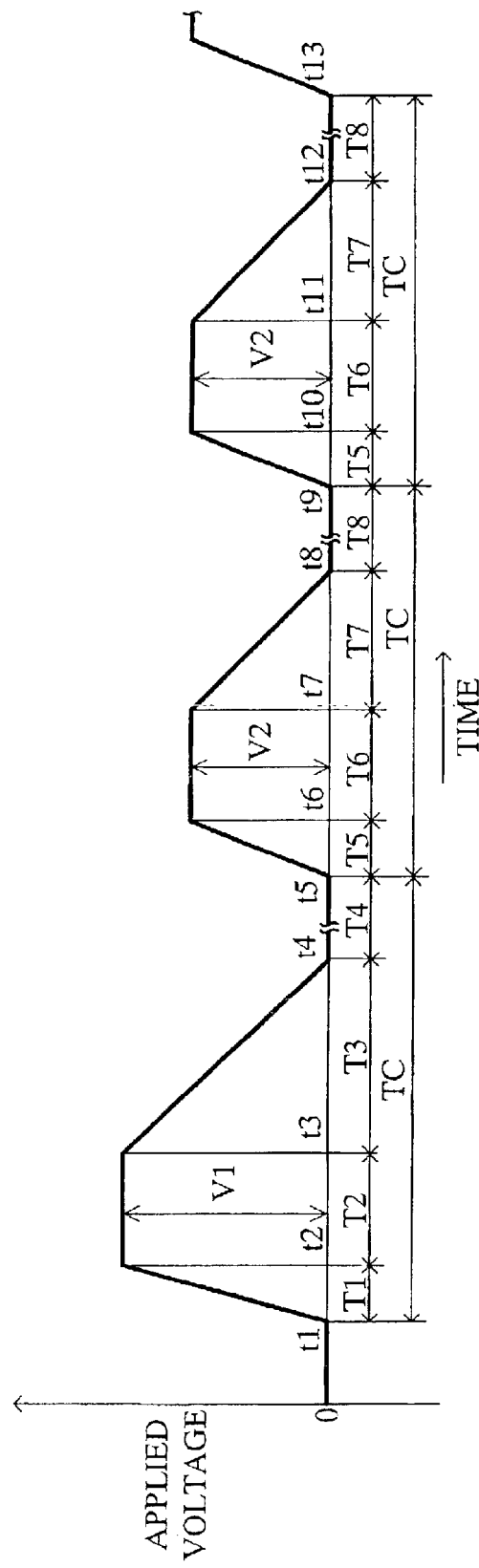
FIG. 13 is a timing diagram showing a waveform of voltage applied to a piezoelectric/electrostrictive element of a micropipette.

Thus, as indicated at times t1 to t2 in FIG. 13, the applied voltage V increases at the rate of change V1/T1 for the duration of first time T1 such that the DNA fragment solution within the pressurizing chamber 30b of each micropipette is pressurized at the first pressurizing rate corresponding to the first voltage increase rate for the ejection as minute liquid droplets from the ejection opening 30d. As a result, liquid droplets adhere to positions indicated at black circles on the 1$^{st}$ glass substrate 11 of FIG. 11, i.e., $(a_1, b_1)$ in 1$^{st}$ row and n-th column (n is integer from 1 to 12, the same is hereinafter applied), and $(a_1, b_1)$ in 3$^{rd}$ row and n-th column.

When proceeding to step 1220, the CPU again resets and starts the timer T, and then goes to step 1225 to keep the applied voltage V at the first voltage V1 (e.g., 60V). The CPU then goes to step 1230 to determine whether the timer T has clocked second time T2 (e.g., 5 μs) or not, and if negative, i.e., if the timer T does not clock the second time T2, then repeats the processing of step 1225. On the contrary, if affirmative, i.e., if the timer T clocks the second time T2, then the CPU makes a "Yes" determination to proceed to step 1235. Thus, as indicated at times t2 to t3 in FIG. 13, the applied voltage V is kept at the value V1 for the duration of the second time T2.

When proceeding to step 1235, the CPU again resets and starts the timer T and then goes to step 1240 in which the applied voltage V is decreased at a first voltage decrease rate V1/T3. In the next step 1245, the CPU determines whether the timer T has clocked third time T3 (e.g., 40 μs) or not. If negative, i.e., if the timer T does not clock the third time T3, then the CPU repeats the processing of step 1240. On the contrary, if affirmative, i.e., if the timer T clocks the third time T3, then the CPU makes a "Yes" determination instep 1245 for advancement to step 1250. Thus, as indicated at times t3 to t4 in FIG. 13, the applied voltage V is decreased at the rate (of change) V1/T3 (=60V/40 μs) for the duration of the third time T3 to consequently increase (restore) the volume of the interior of the pressurizing chamber 30b of each micropipette 21c, so that the pressurizing chamber 30b is filled with liquid from the liquid supply passage 30a via the liquid introduction bore.

When proceeding to step 1250, the CPU again resets and starts the timer T, goes to step 1255 to keep the applied voltage V at 0, and then proceeds to step 1260 to determine whether the timer T clocks fourth time T4 (e.g., 240 s) or not. If negative, i.e., if the timer does not clock the fourth time T4, then the CPU repeats the processing of step 1255. On the contrary, if affirmative, i.e., if the timer T clocks the fourth time T4, then the CPU makes a "Yes" determination in step 1260 and proceeds to step 1295 in which the first ejection routine comes to an end for return to step 935 of FIG. 9. Thus, the applied voltage V is kept at 0 for the duration of the fourth time T4 (=TC−(T+T2+T3)) indicated at t4 to t5 in FIG. 13.

Figure 9:
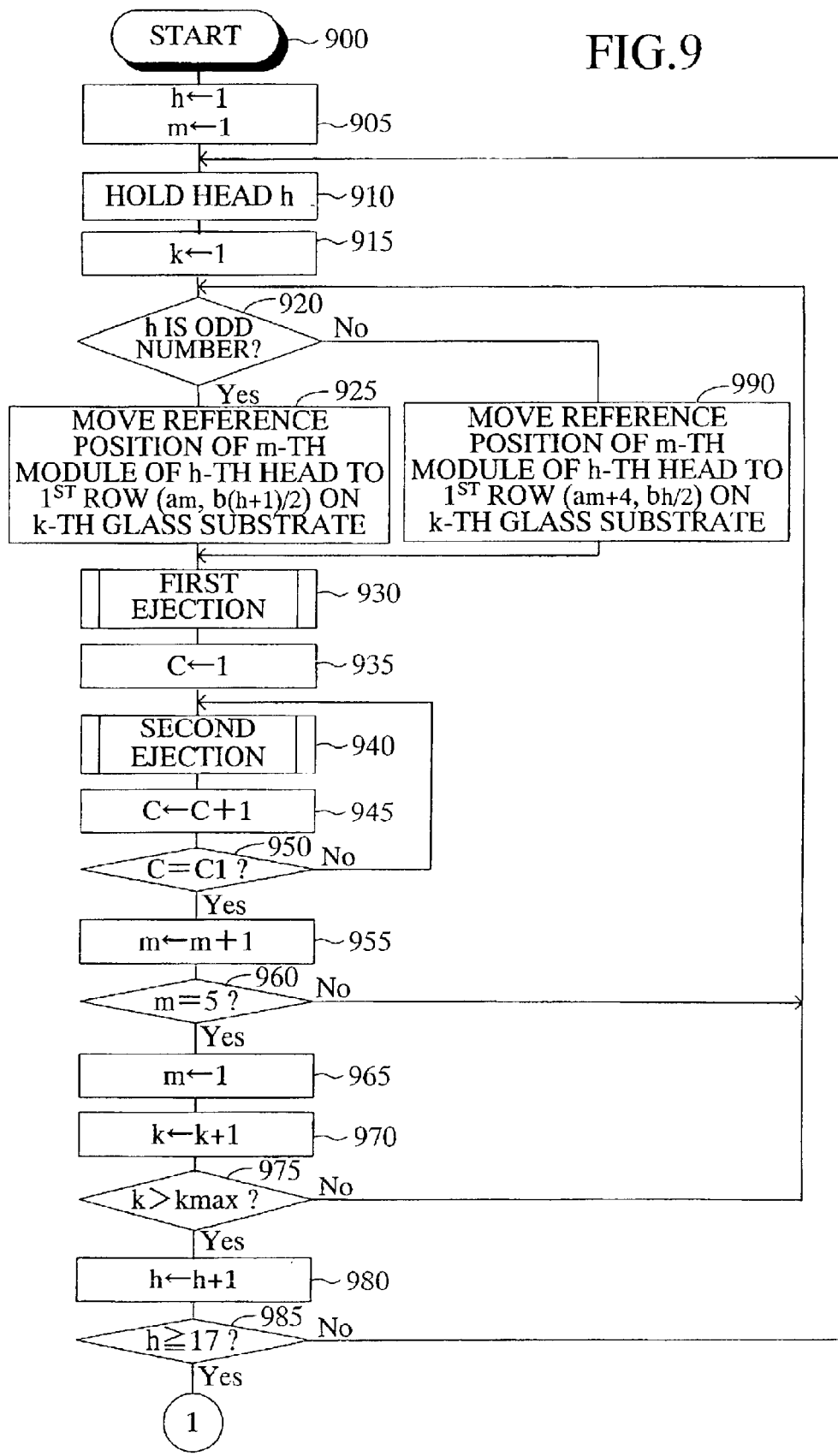
FIG. 9 is a flowchart showing programs executed by a CPU of an electrical control unit shown in FIG. 8.

The CPU then sets the value of the counter C to 1 in step 935 of FIG. 9 and performs second ejection in step 940. More specifically, the CPU starts from step 1400 second ejection routine processing shown in FIG. 14. The second ejection routine merely differs from the first ejection routine in that the applied voltage increase rate in step 1410 is a second voltage increase rate V2/T5 (=50V/15 μs) which is smaller than the first voltage increase rate so that liquid is pressurized at the second pressurizing rate which is smaller than the first pressurizing rate; that the applied voltage kept in step 1425 is V2 (=50V) which is smaller than V1; and that the voltage decrease rate in step 1440 is a second voltage decrease rate V2/T7 (=50V/40 s) which is smaller (gentler) than the first voltage decrease rate. Therefore, detailed description of steps will be omitted herein below. Experiments have proved that ejection of liquid droplets is successfully carried out if the ratio of the first pressurizing rate (first voltage increase rate) to the second pressurizing rate (second voltage increase rate) is more than 1 and not more than 4.8.

As a result of execution of the second ejection routine processing, the applied voltage V rise at the second voltage increase rate V2/T5 (=50V/15 μs) for the duration of fifth time T5 (=T1=15 μs) as indicated at t5 to t6 in FIG. 13 so that liquid containing DNA fragments within the pressurizing chamber 30b is pressurized more gently than upon the first ejection and ejected as minute liquid droplets from the ejection opening 30d. In consequence, liquid droplets are affixed to positions indicated at black circles on the $1^{st}$ (k-th) glass substrate 11 of FIG. 11. From time t6 to t7, the applied voltage V is kept at V2 (=50V) for the duration of sixth time T6 (=T2=5 μs), and from time t7 to t8 the applied voltage V is decreased at the decrease rate of V2/T7 (=50V/40 μs) for the duration of seventh time T7, after which the applied voltage V is kept at 0 for the duration of eighth time T8 (=T4) from time t8 to t9.

Figure 14:
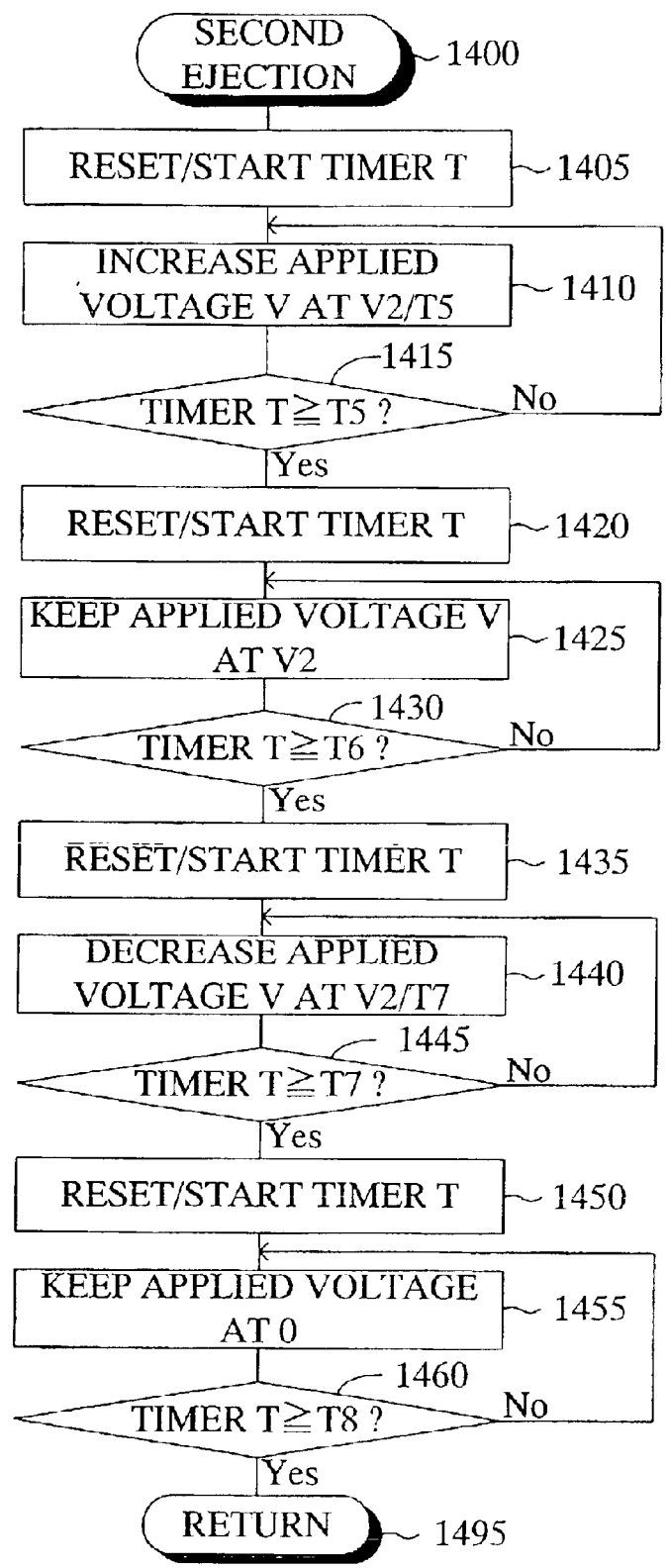
FIG. 14 is a flowchart showing programs executed by the CPU of the electrical control unit shown in FIG. 8.

Once reaching step 1495 of FIG. 14, the CPU goes to step 945 of FIG. 9 to increment the value of the counter C by 1, and then, in next step 950, determines whether the value of the counter C becomes equal to a predetermined value C1 (which is set to 5 herein). Since the value of the counter C is 2 at that time, the CPU makes a "No" determination in step 950 and returns to step 940 to again execute the second ejection routine. Such processing is iterated until the value of the counter C reaches 5, and hence the liquid droplet ejection is carried out four times in total by the second ejection routine. As a result, liquid droplets are ejected onto the same spots (same positions) $(a_1, b_1)$ in the $1^{st}$ row and n-th column and $(a_1, b_1)$ in the $3^{rd}$ row and n-th column over a plurality of times so as to form detection points (spots) having a desired quantity and diameter.

Afterwards, when the value of the counter C reaches 5, the CPU makes a "Yes" determination in step 950 to proceed to step 955 for incrementing the value of the variable m by 1, and then goes to step 960 in which it is determined whether the value of the variable m has reached 5 or not. Since the value of the variable m is 2 at that time, the CPU makes a "No" determination in step 960 to return to step 920. In step 920, the CPU makes a "Yes" determination, due to the value 1, an odd number, of the variable h remaining unvaried, and repeats steps from step 925 to 950.

As a result, the reference position of the second module of the $1^{st}$ head is moved to a position (position indicated by a double circle in FIG. 11) just above $(a_2, b_1)$ in the $1^{st}$ row on the k-th glass substrate. Time Tint1 required for such a movement (more precisely, the sum of the time taken for such a movement and the time T8 from the last second ejection ending timing to the start of the movement) is longer than time Tint2 which is a time interval (=T4) from the first ejection ending timing to the timing of start of the second ejection following the first ejection and which is a time interval (=T8) between successive second ejection start timing and second ejection start timing. In other words, the time Tint1 required for the movement of the head 20a is longer than a predetermined time (given time) Tth, and the time Tint2 is shorter than the predetermined time Tth. For this reason, immediately after the positional movement of the head 20a, the viscosity of the DNA fragment solution in the vicinity of the ejection opening 30d becomes larger (higher) than the viscosity immediately before the execution of the second ejection. Therefore, first carried out is the liquid droplet ejection (first ejection) at that position by a relatively large pressurizing rate based on a single first ejection routine, and then intermittently carried out are the liquid droplet ejections (second ejections) by a relatively small pressurizing rate based on the second ejection routines executed four times in total. As a result, desired detection points are formed at $(a_2, b_1)$ in the $1^{st}$ row and n-th column and $(a_2, b_1)$ in the $3^{rd}$ row and n-th column.

Subsequently, such processings are iterated so that the third module forms detection points at $(a_3, b_1)$ in the $1^{st}$ row and n-th column and $(a_3, b_1)$ in the $3^{rd}$ row and n-th column, i.e., at positions indicated by encircled x marks in FIG. 11 and that the fourth module forms detection points at $(a_4, b_1)$ in the $1^{st}$ row and n-th column and $(a_4, b_1)$ in the $3^{rd}$ row and n-th column, i.e., at positions indicated by encircled vertical segments in FIG. 11. At this stage the CPU changes the value of m to 5 in step 955, and hence it makes a "Yes" determination in step 960 to proceed to step 965 for setting the value of the variable m to 1 and further to step 970 for incrementing the value of the variable k by 1.

The CPU then determines in step 975 whether the value of the variable k has exceeded the maximum glass substrate count kmax per pallet. Since the value 2 of the variable k is smaller than the maximum glass substrate count kmax in this case, the CPU makes a "No" determination in step 975 for return to step 920. At this stage, the value 1 of the variable h remain unchanged, and hence the CPU makes a "Yes" determination in step 920 and then moves the reference position of h-th ($1^{st}$) head m-th module (first module) to a position just above coordinates $(a_m, b_{(h+1)/2}=a_1, b_1)$ in the $1^{st}$ row on the k-th ($2^{nd}$) glass substrate 11 in step 925. The CPU then executes processings of step 930 to 950 and forms detection points on the $2^{nd}$ glass substrate 11 by means of the first module of the $1^{st}$ head.

Afterward, the CPU executes processings of steps 955 and 960 and processings of steps 920 to 950. Once the value of the variable m reaches 5, the CPU sets the value of the variable m to 1 in step 965, increments the value of the variable k by 1 in step 970, and then determines in step 975 whether the value of the variable k has exceeded the maximum glass substrate count kmax. Thus, if detection points are formed on the $1^{st}$ to kmax-th glass substrates 11 by the $1^{st}$ head, then the CPU makes a "Yes" determination in step 975 to proceed to step 980 for incrementing the value of the variable h by 1.

The CPU then goes to step 985 to determine whether the value of the variable h has reached 17 or not. Due to the value 2 of the variable h in this case, the CPU makes a "No" determination in step 985 and returns to step 910 to hold the $2^{nd}$ (h-th) head, after which it sets the value of the variable k to 1 in step 915 and makes a "No" determination in the next step 920 for advancement to step 990. Then, in step 990 the CPU moves the reference position of the first module of the $2^{nd}$ head to a position just above coordinates $(a_{m+4}, b_{h/2})=(a_5, b_1)$ the $1^{st}$ row on the k-th glass substrate 11 shown in FIG. 11, and thereafter executes steps 930 to 950 described above. This results in the formation of detection points at $(a_5, b_1)$ in the $1^{st}$ row and n-th column and at $(a_5, b_1)$ in the $3^{rd}$ row and n-th column on the $1^{st}$ glass substrate 11.

The CPU then iterates the processings of steps 920 to 950 until the variable m, which is incremented by 1 in step 955, reaches 5 to allow "Yes" to be determined in step 960. In this manner, the second module of the $2^{nd}$ head forms detection points at $(a_6, b_1)$ in the $1^{st}$ row and n-th column and $(a_6, b_1)$ in the $3^{rd}$ row and n-th column on the $1^{st}$ glass substrate 11, the third module of the $2^{nd}$ head forms detection points at $(a_7, b_1)$ in the $1^{st}$ row and n-th column and $(a_7, b_1)$ in the $3^{rd}$ row and n-th column, and the fourth module of the $2^{nd}$ head forms detection points at $(a_8, b_1)$ in the $1^{st}$ row and the n-th column and $(a_8, b_1)$ in the $3^{rd}$ row and n-th column.

Subsequently, the value of the variable k is incremented by 1 by the processing of step 970, and every time the value of the variable k exceeds the maximum glass substrate count kmax, the value of the variable h is incremented by 1 by the processing of step 980. Thus, the processings of steps 910 to 980 are iteratively executed until the value of the variable h reaches 17. As a result, detection points are formed on the $1^{st}$ first to kmax-th glass substrates 11 by the h-th ($1 \leq h \leq 16$)

head. All detection points are thus formed at $1^{st}$ rows and $3^{rd}$ rows on the glass substrates 11 lying on the pallet. In the event of using a plurality of pallets, detection points are formed on the $1^{st}$ to kmax-th glass substrates 11 lying on all the pallets, after which the variable h is incremented and the head 20a is replaced with another.

Figure 10:
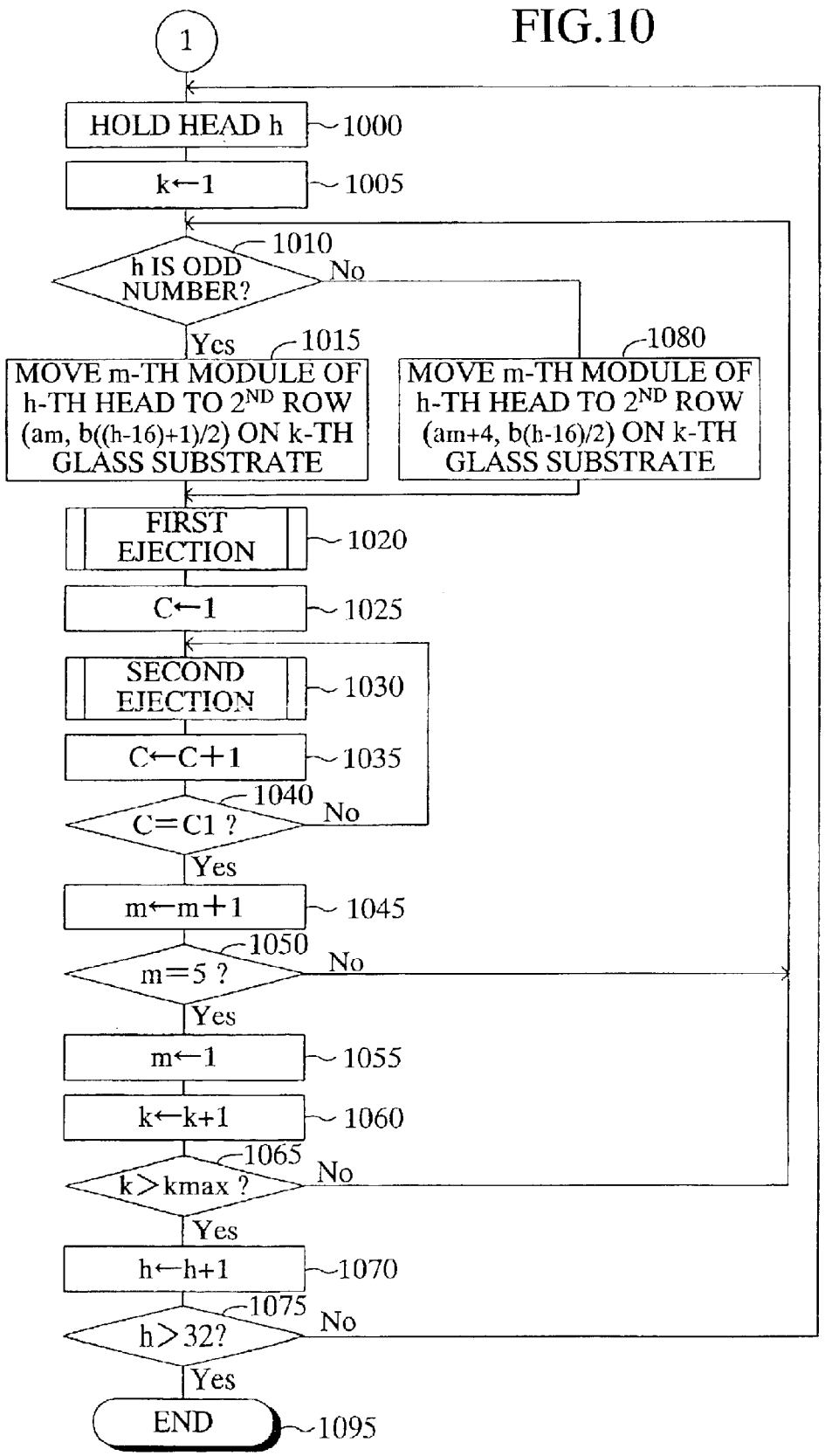
FIG. 10 is a flowchart showing programs executed by the CPU of the electrical control unit shown in FIG. 8.

Then, when the variable h reaches 17, the CPU makes a "Yes" determination in step 985 and goes to step 1000 of FIG. 10 to hold the h-th (in this case, $17^{th}$) head. The CPU then proceeds to step 1005 in which the value of the variable k is again set to 1, and further to step 1010 for determining whether the variable h is an odd number or not. In this event, since the variable h is 17, an odd number, the CPU makes a "Yes" determination in step 1010 and goes to step 1015 in which the reference position of m-th module of the h-th head (in this case, first module of the $17^{th}$ head) is moved to a position just coordinates $(a_m, b_{((h-16)+1)/2})=(a_1, b_1)$ above the $2^{nd}$ row on the k-th glass substrate 11 (in this case, $1^{st}$ glass substrate 11). The CPU then executes the processings of steps 1020 to 1040.

The steps 1020 to 1040 are the same as the steps 930 to 950, respectively. As a result of execution of processings of those steps, detection points are formed at $(a_1, b_1)$ in the $2^{nd}$ row and n-th column and at $(a_1, b_1)$ in the $4^{th}$ row and n-th column on the $1^{st}$ glass substrate 11. In this event as well, ejection is carried out in step 1020 with a relatively large first pressurizing rate based on the first ejection routine due to immediate after the head movement and thus due to the lapse of longer time Tint1 than the predetermined time Tth from the last ejection (pressurizing operation), whereas ejection is carried out in step 1030 with a relatively small pressurizing rate based on the second ejection routine due to the lapse of shorter time Tint2 than the predetermined time Tth from the last ejection (pressurizing operation).

Afterward, the CPU increments the variable m by 1 in step 1045 and iterates the processings of the steps 1010 to 1045 until the variable m reaches 5. As a result, detection points are formed on the $1^{st}$ glass substrate 11 at positions $(a_2, b_1)$ in the $2^{nd}$ row and n-th column and $(a_2, b_1)$ in the $4^{th}$ row and n-th column by the second module of the $17^{th}$ head, at positions $(a_3, b_1)$ in the $2^{nd}$ row and n-column and $(a_3, b_1)$ in the $4^{th}$ row and n-th column by the third module, and at positions $(a_4, b_1)$ in the $2^{nd}$ row and n-th column and $(a_4, b_1)$ in the $4^{th}$ row and n-th column by the fourth module.

When the value of the variable m reaches 5, the CPU makes a "Yes" determination in step 1050 and goes to step 1055 for setting the value of the variable m to 1 and further to the next step 1060 for incrementing the value of the variable k by 1.

The CPU then determines whether the value of the variable k has exceeded the maximum glass substrate count kmax on one pallet. In this case, the value of the variable k is 2 which is smaller than the maximum glass substrate count kmax, and hence the CPU makes a "No" determination in step 1065 for return to step 1010. As a result, the CPU makes a "Yes" determination in step 1010 and, in step 1015, moves the reference position of the m-th module (first module) of the h-th ($2^{nd}$) head to a position just above coordinates $(a_m, b_{((h-16)+1)/2})=(a_1, b_1)$ in the $2^{nd}$ row on the k-th ($2^{nd}$) substrate 11. The CPU then executes the processings of the steps 1020 to 1040 to thereby form detection points on the second glass substrate by the first module of the $17^{th}$ head. Then, in step 1045 the value of the variable m is incremented by 1, and until a "Yes" determination is made in step 1050, the reference position is moved to coordinates $(a_m, b_{((h-16)+1)/2})$ in the $2^{nd}$ row on the k-th ($2^{nd}$) glass substrate 11 so that detection points are formed.

Such processings are iterated, and once the value of the variable k incremented in step 1060 exceeds the maximum glass substrate count kmax, the CPU makes a "Yes" determination in step 1065 to proceed to step 1070 for incrementing the value of the variable h by 1, and further to the next step 1075 for determining whether the value of the variable h has exceeded 32 or not. In this case, the value of the variable h is 18, and hence the CPU makes a "No" determination in step 1075 for return to step 1000 to hold the $18^{th}$ head.

At this point of time, the variable h is an even number. Therefore, the CPU makes a "No" determination in step 1010 and goes to step 1080 in which the reference position of the m-th module of the h-th head (in this case, first module of the $18^{th}$ head) is moved to a position just above coordinates $(a_{m+4}, b_{(h-16)/2})=(a_5, b_1)$ in the $2^{nd}$ row on the k-th (due to step 1005, $1^{st}$ in this case) glass substrate 11. Subsequently, the CPU executes steps 1020 to 1040. As a result, detection points are formed at positions $(a_5, b_1)$ in the $2^{nd}$ row and n-th column and $(a_5, b_1)$ in the $4^{th}$ row and n-th column on the $1^{st}$ glass substrate 11.

Afterward, the CPU increments the variable m by 1 in step 1045 and iterates the above processings until the variable m reaches 5. As a result, detection points are formed on the $1^{st}$ glass substrate 11 at positions $(a_6, b_1)$ in the $2^{nd}$ row and n-th column and $(a_6, b_1)$ in the $4^{th}$ row and n-th column by the second module of the $18^{th}$ head, positions $(a_7, b_1)$ in the $2^{nd}$ row and n-th column and $(a_7, b_1)$ in the $4^{th}$ row and n-th column by the third module, and positions $(a_8, b_1)$ in the $2^{nd}$ row and n-th column and $(a_8, b_1)$ in the fourth row and n-th column by the fourth module.

Subsequently, the above processings are iteratively carried out, and when 33 is reached by the variable h which is incremented by 1 every time the value of the variable k exceeds the maximum glass substrate count kmax, the CPU makes a "Yes" determination in step 1075 and goes to step 1095 to bring the routine to an end. As a result, all detection points are formed in $2^{nd}$ and $4^{th}$ rows on the glass substrates 11 resting on the pallet by means of the $17^{th}$ to $32^{nd}$ heads. In this case as well, if a plurality of pallets are used, arrangement is such that the variable h is incremented after the formation of detection points on the $1^{st}$ to kmax-th glass substrates 11 lying on all the pallets.

As set forth hereinabove, according to the liquid droplet ejecting method of the present invention, the head position is moved to a predetermined position and the pressurizing operations are intermittently iterated by the pressurizing means 40 so that a single minute liquid droplet ejected from the ejection opening 30d for each pressurizing operation is adhered plural times to the same spot on the glass substrate 11 to form a detection point. When the detection point is formed at the predetermined spot, the head 20a is moved to successively perform the pressurizing operation for ejection of minute liquid droplets. At that time, the rate of pressurization of liquid within the pressurizing chamber (effected) by the pressurizing means 40 is changed depending on the interval between the iterated pressurizing operations. In the above example, longer time is required for the movement of the head 20a than the interval between the pressurizing operations in the case of iterative ejections at the same spot, and hence the pressurizing rate for the first ejection immediately after movement of the head is set to a larger value than the pressurizing rate for iterative ejections at the same spot. In other words, the longer the interval between the iterated pressurizing operations (the interval between successive pressurizing operations) is, the larger the pressurizing rate (thus, initial velocity of the minute liquid droplet ejected) becomes. As a result, the liquid can be pressurized for ejection at (with) the pressurizing rate depending on the status of liquid whose viscosity varies (increases) with the lapse of time (in which the liquid is exposed to the air, for instance), thereby making it possible to prevent the liquid droplets from scattering in the vicinity of the ejection opening 30d and from deviating from the target direction to eject the liquid droplets.

It should be understood that the present invention is not limited to the above embodiment and could variously be modified without departing from the scope and spirit of the present invention. For instance, the ejected solution is a solution containing DNA fragments in the above embodiment, but instead it may be other solutions whose viscosities vary with the lapse of time, such as solutions containing proteins (including antibodies) or other intravital substances.

Figure 8:
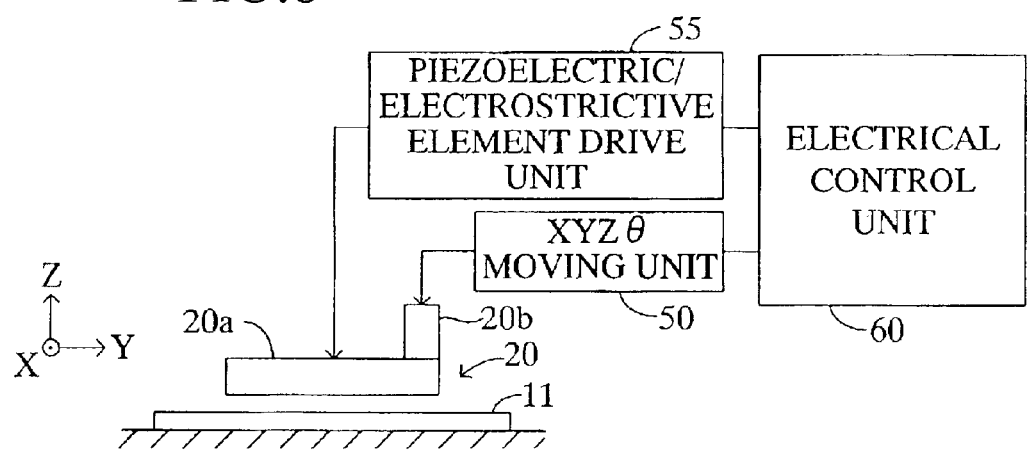
FIG. 8 is a schematic block diagram of a system for controlling the liquid droplet ejection apparatus shown in FIG. 1.

Although the CPU of the electrical control unit 60 was used to control the applied voltage in the above embodiment, the piezoelectric/electrostrictive element drive unit 55 shown in FIG. 8 could be used as a function generator having a memory which in advance stores waveforms similar to the waveform shown in FIG. 13. In this case, the function generator may read a waveform of the applied voltage from the memory in response to an instruction for the first ejection or the second ejection from the CPU of the electrical control unit 60, and apply this voltage across the upper electrode 42 and the lower electrode 43 of each of the micropipettes 21c. Employment of this function generator would enable detailed applied voltage waveform control to be performed. For instance, the V1 may be 60V, V2 be 50V, T1 and T5 be 2.5 $\mu$s, T2 and T6 be 5 $\mu$s, T3 and T7 be 40 $\mu$s, T4 and T8 be 252.5 $\mu$s. Another arrangement could also be employed in which the intervals between the intermittently iterated ejections are measured by the timer so that the pressurizing rate (applied voltage increase rate, or initial velocity of droplets ejected) is varied depending on the intervals measured.

Although a single pallet having 20 (kmax) glass substrates 11 arrayed thereon was used for the simultaneous fabrication of 20 DNA chips in the above embodiment, a plurality of (e.g., 2 to 30) such pallets may be prepared so that after the formation of detection points on all the glass substrates lying on all the pallets by means of the h-th head 20a, the (h+1)th head 20a replaces the h-th head 20a to form detection points on all the glass substrates lying on all the pallets. This would allow simultaneous, efficient manufacture of DNA chips in several hundreds.

What is claimed is:

1. A method for ejecting liquid droplets by use of a liquid droplet ejection apparatus, said liquid droplet ejection apparatus comprising a pressurizing chamber which has an ejection opening and which is filled with liquid whose viscosity varies with the lapse of time, and pressurizing means for pressurizing said liquid within said pressurizing chamber, said liquid droplet ejection apparatus configured to eject said liquid in the form of substantially a single minute liquid droplet from said ejection opening through a single pressurizing operation by said pressurizing means, characterized in that a plurality of minute liquid droplets are ejected through intermittently iterating said single pressurizing operation by said pressurizing means, and a rate of pressurization by said pressurizing operation is varied depending on intervals between said pressurizing operations iterated.

2. A method for ejecting liquid droplets according to claim 1, wherein said intermittent ejections of said minute liquid droplets is performed onto the same spot to form a single liquid droplet at said spot.

3. A method for ejecting liquid droplets according to claim 2, wherein said liquid is pressurized for ejection at a first pressurizing rate when the interval from the last pressurizing operation to the current pressurizing operation is longer tan predetermined time) and said liquid is pressurized for ejection at a second pressurizing rate which is smaller than said first pressurizing rate when the interval from the last pressurizing operation to the current pressurizing Operation is shorter than said predetermined time.

4. A method for ejecting liquid droplets according to claim 3, wherein said pressurizing means is a piezoelectric/electrostrictive element which changes the volume of said pressurizing chamber depending on voltage applied, the rate of change of said voltage is set to a first voltage increase rate when said liquid is pressurized at said first pressurizing rate, and said rate of change of said voltage is set to a second voltage increase rate which is smaller than said first voltage increase rate when said liquid is pressurized at said second pressurizing rate.

5. A method for ejecting liquid droplets according to claim 4, wherein the ratio of said first pressurizing rats to said second pressurizing rate is set to a value which is more than 1 and not more than 4.8.

6. A method for ejecting liquid droplets according to claim 5, wherein the initial velocity of minute droplets ejected by pressurizing operation at said first pressurizing rate is a velocity of 0.1 to 10 m/s.

7. A method for ejecting liquid droplets according to claim 1, wherein said liquid is a solution containing intravital substances.

8. A liquid droplet ejection apparatus having a pressurizing chamber which has an ejection opening and which is filled with liquid whose viscosity varies with the lapse of time, and pressurizing means for pressurizing said liquid within said pressurizing chamber, to eject said liquid in the form of substantially a single minute liquid droplet from said ejection opening through a single pressurizing operation by said pressurizing means, comprising:
    means for ejecting a plurality of minute liquid droplets through intermittently iterating said single pressurizing operation by said pressurizing means; and
    means for varying a rate of pressurization by said pressurizing operation depending on intervals between said pressurizing operations iterated, said means for varying a rate of pressurization including means for applying sustained voltage pulses of different magnitude to said pressurizing means.

9. A liquid droplet ejection apparatus having a pressurizing chamber which has an ejection opening and which is filled with liquid whose viscosity varies with the lapse of time, and pressurizing means for pressurizing said liquid within said pressurizing chamber, to eject said liquid in the form of substantially a single minute liquid droplet from said ejection opening through a single pressurizing operation by said pressurizing means, comprising:
    means for ejecting plurality of minute liquid droplets through intermittently iterating said single pressurizing operation by said pressurizing means, said means for ejecting ejects said minute liquid droplets intermittently onto the same spot to form a single liquid droplet at said spot; and
    means for varying a rate of pressurization by said pressurizing operation depending on intervals between said pressurizing operations iterated.

10. A liquid droplet ejection apparatus according to claim 9, wherein said means for varying a rate of pressurization varies said rate of pressurization in such a manner that said liquid is pressurized for ejection at a first pressurizing rate when the interval from the last pressurizing operation to the current pressurizing operation is longer than predetermined time, and said liquid is pressurized for ejection at a second pressurizing rate which is smaller than said first pressurizing rate when the interval from the last pressurizing operation to the current pressurizing operation is shorter than said predetermined time.

11. A liquid droplet ejection apparatus according to claim 10, wherein said pressurizing means is a piezoelectric/electrostrictive element which changes the volume of said pressurizing chamber depending on voltage applied, the rate of change of said voltage is set to a first voltage increase rate when said liquid is pressurized at said first pressurizing rate, and said rate of change of said voltage is set to a second voltage increase rate which is smaller than said first voltage increase rate when said liquid is pressurized at said second pressurizing rate.

12. A liquid droplet ejection apparatus according to claim 11, wherein the ratio of said first pressurizing rate to said second pressurizing rate is set to a value which is more than 1 and not more than 4.8.

13. A liquid droplet ejection apparatus according to claim 12, wherein the initial velocity of minute droplets ejected by pressurizing operation at said first pressurizing rate is a velocity of 0.1 to 10 m/s.

14. A liquid droplet ejection apparatus according to claim 9, wherein said liquid is a solution containing intravital substances.

15. A liquid droplet ejection apparatus according to claim 8, wherein the magnitude of a first one of said sustained voltage pulses is greater than that of subsequent sustained voltage pulses.

* * * * *

UNITED STATES PATENT AND TRADEMARK OFFICE
CERTIFICATE OF CORRECTION

PATENT NO. : 6,899,283 B2
DATED : May 31, 2005
INVENTOR(S) : Takao Ohnishi, Toshikazu Hirota and Yoshihiro Iseki It is certified that error appears in the above-identified patent and that said Letters Patent is hereby corrected as shown below:

Column 14,
Line 6, please change "tan" to -- than --
Line 7, please change "time)" to -- time, --
Line 10, please change "Operation" to -- operation --
Line 23, please change "rats" to -- rate --
Line 58, please add -- a -- after "ejecting"

Signed and Sealed this

Nineteenth Day of July, 2005

JON W. DUDAS
*Director of the United States Patent and Trademark Office*